(No Model.)

H. A. BAXTER.
WAGON BRAKE.

No. 562,348. Patented June 16, 1896.

Witnesses
William H. Sherman
William P. Smith

Inventor
Henry A. Baxter,
by Frank E. Adams,
Attorney

UNITED STATES PATENT OFFICE.

HENRY A. BAXTER, OF SEATTLE, WASHINGTON.

WAGON-BRAKE.

SPECIFICATION forming part of Letters Patent No. 562,348, dated June 16, 1896.

Application filed August 22, 1895. Serial No. 560,187. (No model.)

*To all whom it may concern:*

Be it known that I, HENRY A. BAXTER, a citizen of the United States, residing at Seattle, in the county of King and State of Washington, have invented new and useful Improvements in Radial Rods for Wagon-Brakes, of which the following is a specification.

My invention relates to improvements in wagon-brakes in which radial rods operate in steadying the brake-block by passing over the axle of the wheels; and the objects of my improvement are, first, to provide a more direct connection between the crank of the brake and the radial rod; second, to avoid the wear of the block by the crank; third, to support the block so as to avoid its tipping sidewise on the crank; fourth, to avoid the rattle and wear of the rod upon the axle. I attain these objects by the mechanism illustrated in the accompanying drawings, in which—

Figure 1:
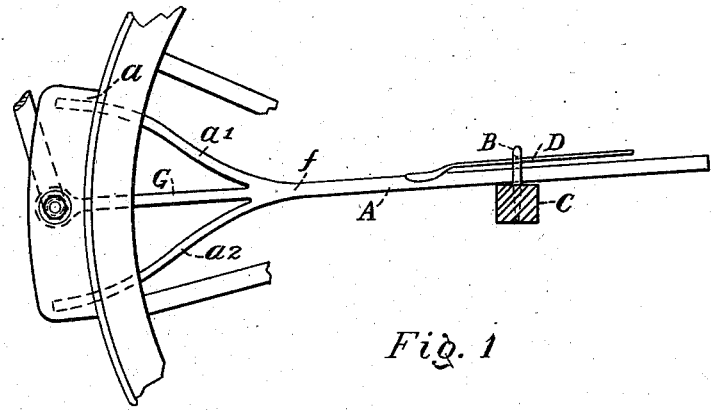
Figure 2:
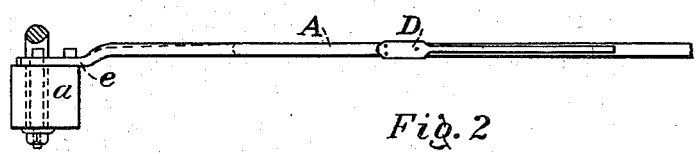
Figure 3:
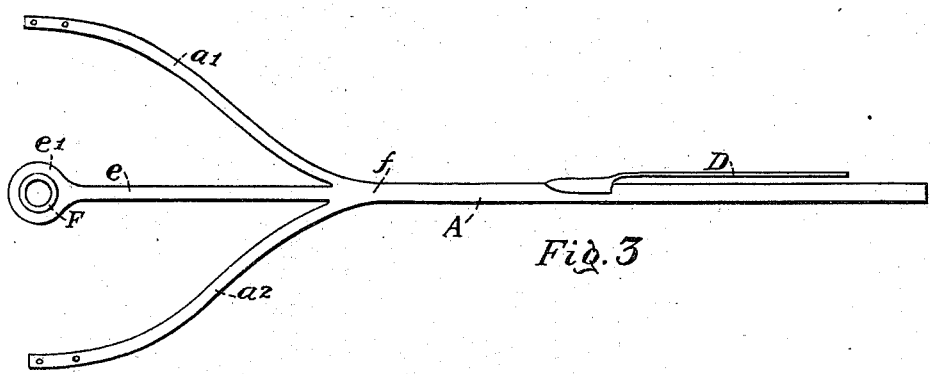
Figure 4:
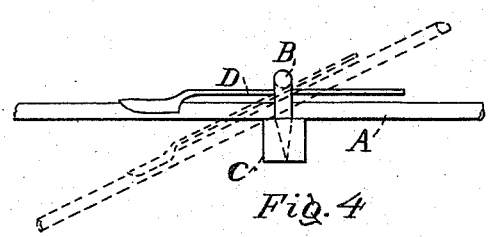
Figure 5:
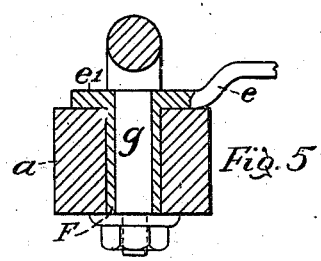

Figure 1 is a side elevation of part of a wagon-wheel tire, showing the axle in section and the spokes broken away and my improved radial rod attached. Fig. 2 is a plan view of same. Fig. 3 is a side elevation of my improved radial rod. Fig. 4 is a side elevation of part of the radial rod, showing the operation of my spring. Fig. 5 is a sectional view of the block, showing my improved support-bushing.

Similar letters refer to similar parts throughout the several views.

The stem A of the radial rod operates in a steadier B, which is fast to the wagon-axle C, the hole through the steadier in which the stem A operates being of sufficient size to allow for the operation of the rod, as shown in Fig. 4. A spring D is secured to or made part of the stem A, and operates in the steadier B, securing the stem at all times from any vibration.

The stem A is provided with the curved forks $a'$ $a^2$, which are secured to the brake shoe or block $a$, as indicated. This stem A is also provided with an extension G, which is diametrically flattened near its outer end and provided with a lateral offset $e$, said offset provided with a circular disk $e'$, and a bushing F, set at right angles to the under surface of the disk $e'$.

I have found that in applying a radial rod to a wagon-brake, if the wheel is revolving forward, when the brake is set, as in descending hills, the pressure is downward on the block or brake-shoe and the tendency is to spring the radial rod at the fork or point $f$, as indicated on the accompanying drawings. It often happens that the rod is bent at this point in consequence. It is obvious, that, there being no support other than that afforded by the axle, this is reasonably sure to occur, in time, to any radial rod constructed with a fork, and without my extension; while, in case a single rod is used connecting the brake-shoe and the axle, the shoe or block is not held radial.

By the introduction of my extension G, the pressure exerted by the wheel, when the brake is set, is supported upon the crank-pin $g$; and by the introduction of this third member in the fork, the radial rod is strengthened materially and in consequence may be made of much lighter material, thus reducing the cost.

It is clear to all who are familiar with the ordinary brake-shoe and crank-pin, as shown in the accompanying drawings, that the opening through the shoe, containing the crank-pin, is, in the ordinary construction, worn large, and the block becomes loose, tipping to either side, and rattling when the brake is loose. To avoid this and to support the block at all times and increase its life, I provide the bushing F, which is attached to or made part of the disk $e'$. The block is fitted about this bushing and the crank-pin passes through it, as shown in Fig. 5.

The bushing F and extension-rod G securely retain the brake-shoe $a$ in its proper position at all times and by the introduction of these important improvements replacement of the brake-shoes is not necessary by reason of their wearing rounding, and the brake acts upon the tire with full contact at all times.

By the introduction of the spring D, I am enabled to provide a radial rod which will not rattle in the steadier B, when the shoe is free from the wheel and loose. In the ordinary brake provided with a radial rod this constant rattle is very annoying and the axle, steadier, and rod are subjected to a material wear thereby. This is obviated by the use of my spring D, which may be attached to or made a part of the rod A.

The opening in the steadier in which the stem A operates must be of sufficient size to allow the rod to take different angles, as shown in Fig. 4. Thus it is easily understood why the rod rattles in the ordinary case; and the advantage of the spring D.

I am aware that prior to my invention radial rods have been applied to wagon-brakes. I therefore do not claim such an invention broadly; but What I do claim, and desire to secure by Letters Patent, is—

1. In radial rods for wagon-brakes, having bifurcations $a'$ and $a^2$ and an extension-rod G, a flat spring D attached to said rod and extending longitudinally thereon and adapted to operate therewith in a steadier B, attached to the wheel-axle; substantially as shown and set forth.

2. In radial rods for wagon-brakes, the extension-rod G, provided with a disk $e'$, and bushing F, substantially as shown and set forth.

3. In radially-operating wagon-brakes; the combination with the brake-shoe $a$, the crank thereof, and a steadier B attached to the wheel-axle; of the radial rod thereof constituting the rod A provided with a flat spring D extending longitudinally with said rod and adapted to operate therewith in said steadier, and having bifurcations $a'$ and $a^2$ attached to said brake-shoe and the extension-rod G having a bushing F adapted to enter through an aperture in said brake-shoe, said bushing fitting around and operating on said crank and adapted to maintain the brake-shoe in an erect position, substantially as shown and set forth.

4. The combination in wagon-brakes, of a radial rod A, bifurcations $a'$ and $a^2$, with an extension-rod G, containing a disk $e'$, and bushing F, provided with a crank-pin opening substantially as shown and set forth.

5. In radial rods for wagon-brakes, a spring D, attached to said rod, and an extension-fork G, containing a disk $e$, provided with a bushing F, substantially as shown and set forth.

HENRY A. BAXTER.

Witnesses:
FRANK E. ADAMS,
JAY H. LEWIS.